March 11, 1952  E. J. BAUSCH ET AL  2,588,953
SAW ATTACHMENT FOR TRACTORS
Filed Sept. 16, 1948  3 Sheets-Sheet 1

Inventors
EVAN J. BAUSCH
WALTER W. MULANAX
By Fishburn + Mullendore
Attorneys

March 11, 1952  E. J. BAUSCH ET AL  2,588,953
SAW ATTACHMENT FOR TRACTORS
Filed Sept. 16, 1948  3 Sheets-Sheet 2
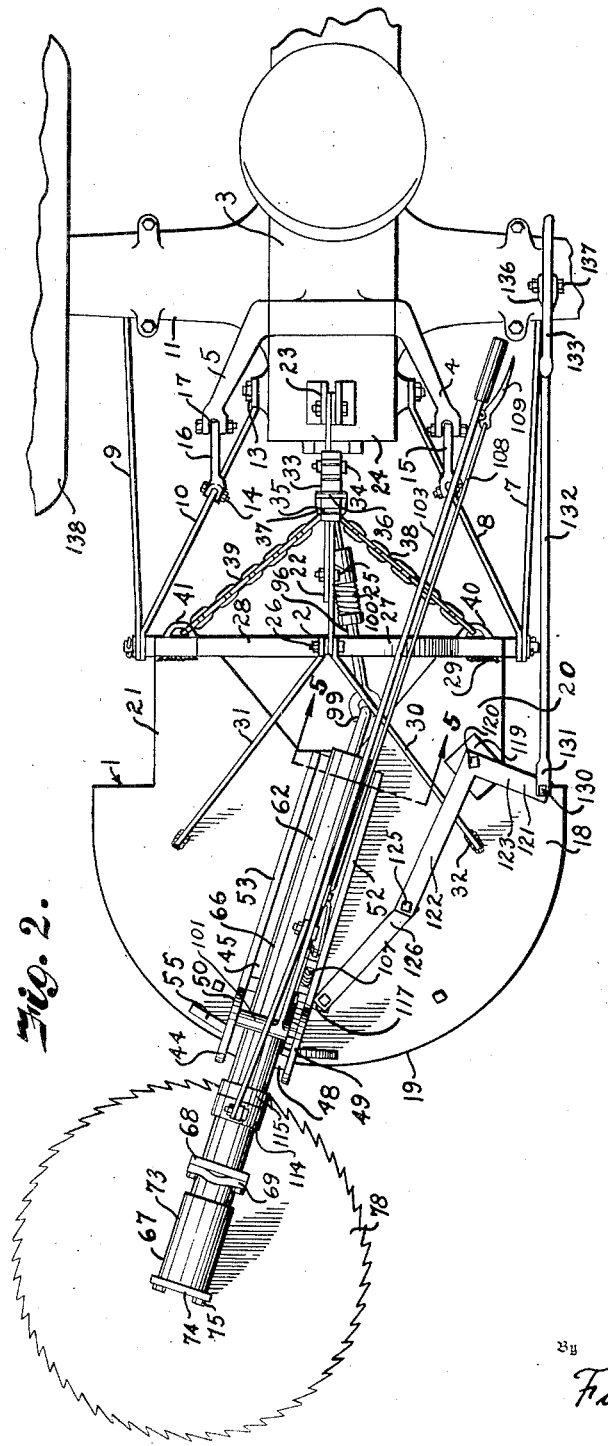
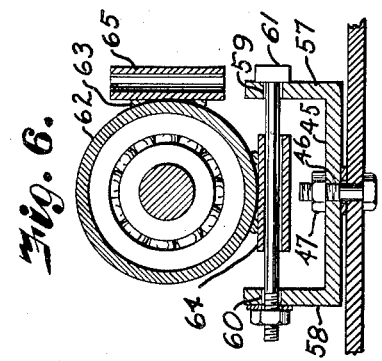
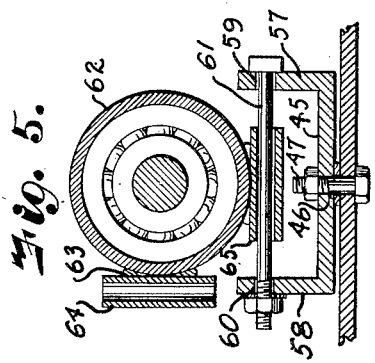
Inventor
EVAN J. BAUSCH +
WALTER W. MULANAX
Attorneys March 11, 1952  E. J. BAUSCH ET AL  2,588,953
SAW ATTACHMENT FOR TRACTORS
Filed Sept. 16, 1948  3 Sheets-Sheet 3
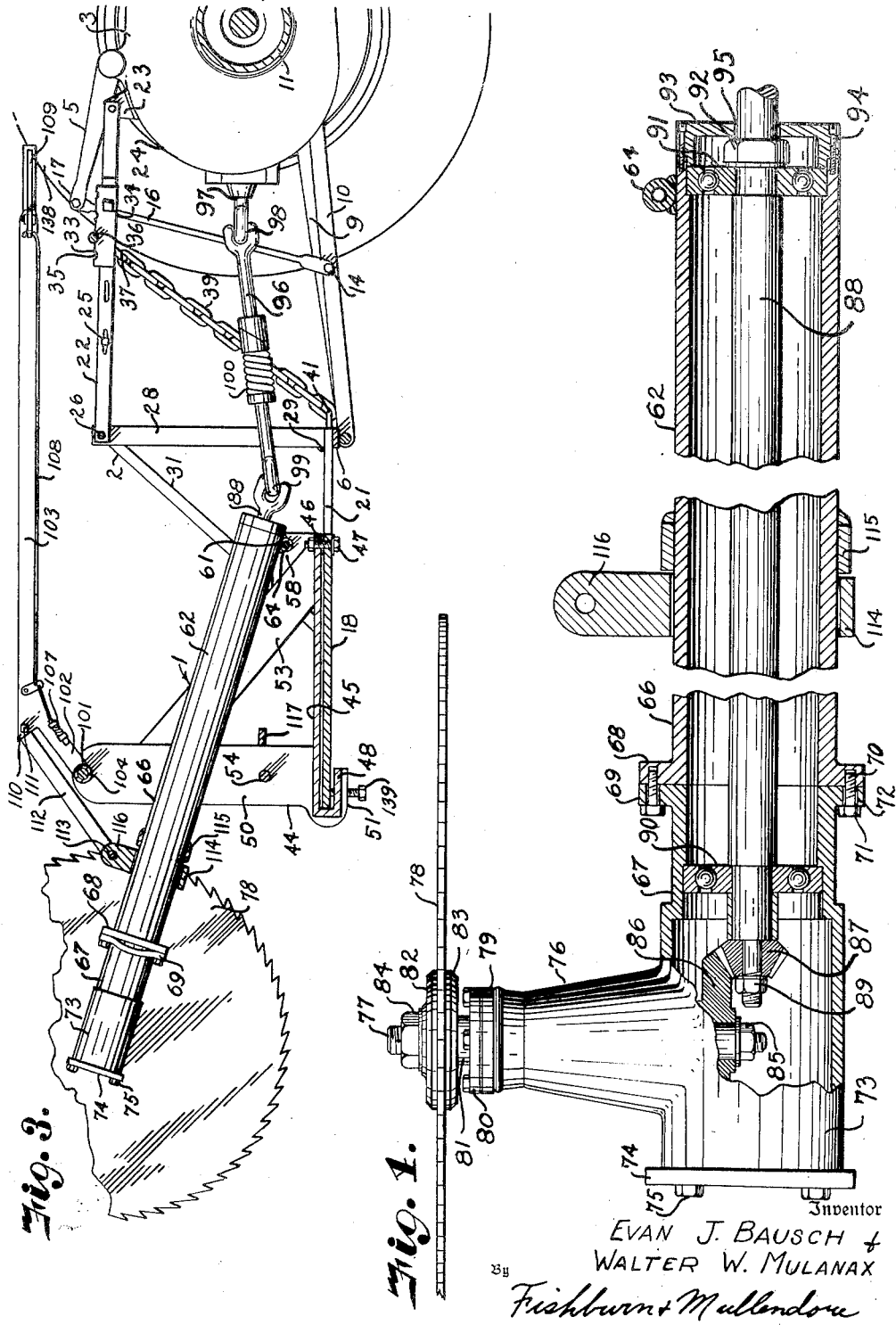
Inventor
EVAN J. BAUSCH &
WALTER W. MULANAX
By Fishburn & Mullendore
Attorneys Patented Mar. 11, 1952

2,588,953

UNITED STATES PATENT OFFICE 2,588,953

SAW ATTACHMENT FOR TRACTORS

Evan J. Bausch and Walter W. Mulanax, Hoyt, Kans., assignors to B-M-B Company, Inc., Holton, Kans., a corporation Application September 16, 1948, Serial No. 49,478

7 Claims. (Cl. 143—43)

This invention relates to a saw attachment for tractors, and more particularly to a saw adapted to be attached to the rear of a tractor and operated by the power take-off of such tractor.

The principal object of the present invention is to provide a power saw attached to the rear end of the tractor to be operated by the power take-off of the tractor and to provide levers for feeding the saw into the work when the saw is either in vertical or horizontal position.

Other objects of the present invention are to provide an attachment adapted to be mounted on the hydraulic lift for raising and lowering the frame attachment to regulate the height of the saw; to provide a platform secured to said frame and tiltable thereon for adjusting the angularity of the saw; to provide a frame on said platform for mounting the saw thereon so that it can be moved laterally with respect to said attaching frame and said platform for feeding the saw into the work; to provide driving mechanism for the saw which may be raised and lowered for feeding the saw into the work when cutting in a vertical position; to provide means for rotatably mounting the saw on the driving mechanism; and to provide a device of this character, simple, economical to manufacture and efficient in operation.

In accomplishing these and other objects of the present invention, I have provided improved details of structure, the preferred forms of which are illustrated in the accompanying drawings, wherein:

Fig. 2 is a top plan view of our invention showing the saw in horizontal position.

Fig. 3 is a side view with parts of the saw broken away and the platform and pivotal mounting of the standard shown in sections.

Fig. 4 is a fragmentary section of a shaft tube and driving mechanism in cross section to illustrate the bearings and gear mechanism.

Fig. 5 is a transverse sectional view taken on line 5—5, Fig. 2.

Fig. 6 is a view similar to Fig. 5 but showing the mechanism when the saw is in horizontal position.

Figure 1:
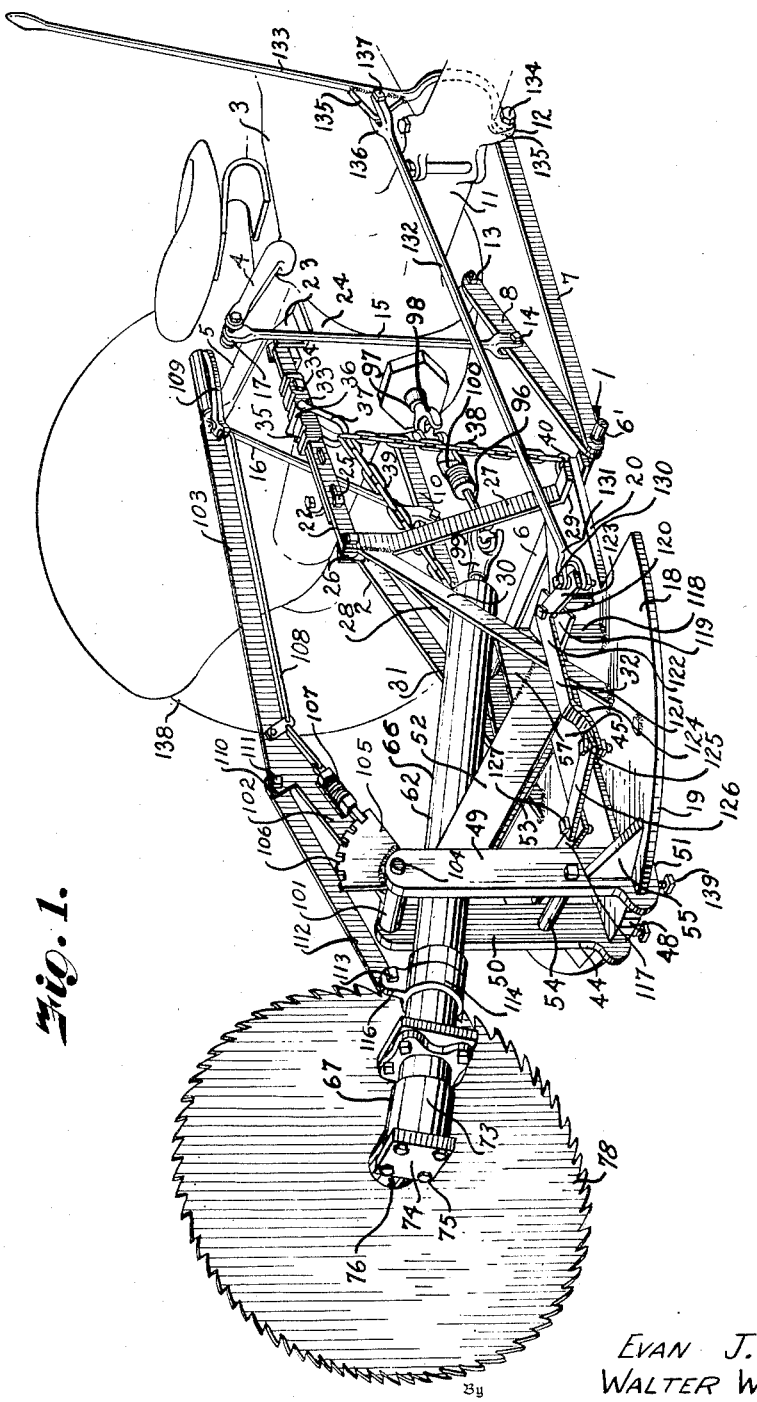
Fig. 1 is a perspective view embodying the features of our invention.

Referring more in detail to the drawings:

1 designates a power attachment for tractors embodying the features of our invention comprising, a frame work 2 adapted to be secured to the rear of a tractor or the like 3 and particularly to the hydraulic lifting mechanism carried by such tractor as indicated by the arms 4 and 5, operable by mechanism (not shown) on the tractor.

The frame consists of a cross bar 6 provided with round ends 6' upon which are pivotally mounted braces 7—8 and 9—10 which extend forwardly and have their forward ends pivotally secured to the rear axle housing 11 of the tractor 3 as indicated at 12 and 13 (Fig. 1). Pivotally attached to substantially the centers of the braces 8 and 10 by bolts or the like 14 are rods 15 and 16 having their upper ends pivotally connected to the hydraulic arms 4 and 5 as indicated at 17 (Fig. 1). The round ends of the bar 6 extend through the rear ends of the braces so that the rod will pivot on the braces. The braces may be retained on the rods in any suitable manner.

A platform 18 of substantially semi-circular shape and having a rounded rear portion as indicated at 19 is provided with forwardly extending arms 20 and 21, the forward ends of the arms being rigidly secured to the cross bar 6 by welding or other suitable means.

An arm 22 is pivotally secured to a bracket 23 carried by the housing 24 of the tractor 3, the arm 22 comprising two strap irons adapted to lie alongside each other and provided with openings adapted to receive bolts or the like 25 for adjusting the length of the arm. Secured to the rear end of the arm 22 by bolts 26 are braces 27 and 28 which extend downwardly and outwardly and are provided with horizontal terminal ends as indicated at 29 (Fig. 1) which are welded or otherwise suitably secured to the platform 18 as indicated at 32. The adjustable arm 22 is provided for regulating the angularity of the platform 18 with respect to the frame 2.

To stabilize the frame work structure we preferably provide a sleeve 33 adapted to engage the arm 22 and held rigidly thereon by a setscrew or the like 34, the upper part of the sleeve being provided with grooves 35 adapted to receive the cross arm 36 of a clevis or the like 37 to which are attached chains 38 and 39 extending outwardly and having their lower ends secured to forwardly extending ears 40 and 41 secured to the cross bar 6 as best illustrated in Fig. 2, the notches in the sleeve being provided for adjustability of the length of the chains as desired.

A frame work structure 44 comprising a horizontal plate 45 having its forward end provided with an opening 46 adapted to receive a bolt or the like 47 is provided for pivotally mounting the frame work structure on the platform. The rear end of the plate 45 is turned downwardly and forwardly to provide a hook 48 extending under the platform 18. Uprights or standards 49 and 50 are rigidly secured to the rear end of the bar 45 by welding or other suitable means and are also provided with hooks as indicated at 51 extending underneath the platform. Forwardly extending braces 52 and 53 are provided for the upright, the rear end being rigidly secured to the upright by welding and the forward end extending downwardly and being welded or otherwise suitably secured to the forward end of the plate 45. The uprights are provided with a brace bar 54 near the lower ends thereof and side braces 55 (Fig. 1).

Rigidly secured to the downwardly extending braces 52 and 53 are horizontal members 57 and 58 provided with openings 59 and 60 adapted to receive a bolt or the like 61 for a purpose later described.

Rigidly mounted on a shaft housing 62 by welding or other suitable means as indicated at 63 (Fig. 5) are sleeves 64 and 65 adapted to receive the bolt 61 to pivotally mount the shaft housing thereon, the plurality of sleeves being provided to mount a saw in different positions as will later be described. The shaft housing 62 extends rearwardly between the standards 49 and 50 and is adapted to pivot upwardly and downwardly therebetween.

The shaft housing 62 is preferably made in two pieces 66 and 67, the mating ends being provided with flange portions 68 and 69. The flange 68 is provided with threaded sockets adapted to receive the threaded shank 70 of bolts 71 extending through openings 72 in the flange portion 69 for a purpose later described. The rear portion of the shaft housing is provided with a gear housing 73 closed by a plate 74 by bolts or the like 75. Extending laterally from the housing 73 is a housing 76 through which extends a shaft 77 upon which is mounted a saw 78. The housing 76 is provided with a flange head 79 adapted to receive a flange 80 of a hub 81 for fastening the saw on the shaft 77, the saw being held on the shaft between plates 82 and 83 by a nut 84 as is the usual practice.

Mounted on the inner end of the shaft 77 and held thereon by a nut 85 is a beveled gear 86 adapted to mesh with a gear 87 carried on the rear end of a shaft 88 extending through the shaft housing 62. The gear 87 being held in place on the shaft 88 by a nut 89. Bearings 90 and 91 are provided near the respective ends of the shaft housing 62 for the shaft 88 and the shaft is held in place by a nut 92 on the forward end between the bearing 91 and a cap 93 held in place on the shaft housing by setscrews or the like 94. The cap 93 has an opening 95 through which the forward end of the shaft 88 extends.

The shaft 88 is driven by a universal connection 96 connected to the take-off of the tractor as indicated at 97 having the usual connections as indicated at 98 and 99 and is provided with the conventional slip clutch 100.

The mechanism for raising and lowering the shaft housing 62 to adjust the desired height of the saw comprises a sleeve 101 to which is rigidly attached by welding or other suitable means an arm 102 of a lever 103, the sleeve 101 being pivotally mounted between the upper ends of the standard 49 and 50 by a bolt or the like 104. Rigidly secured to the upper end of the standard 49 by welding or other suitable means is a bracket 105 provided with notches 106 adapted to receive a latching member 107 operable through rod 108 and a pivoted member 109 attached to the outer end of the lever as is the usual practice. The lever 103 has an offset portion 110 to which is pivotally secured by bolt 111, a line 112 having its forward end pivotally secured by a bolt 113 to a sleeve 114 slidable on the housing 62. The movement of the sleeve 114 forwardly on the shaft housing is limited by a collar 115 which is rigidly secured on the housing, the link 112 being secured to the sleeve 114 through ears 116 having openings through which the bolt 113 extends. Movement of the lever 103 upwardly will cause the rear end of the shaft housing 62 to lower and downward movement of the lever will raise the rear end of such housing.

The mechanism for lateral movement of the saw to feed it to the work comprises a horizontal bar 117 rigidly secured to the standards 49 and 50 adjacent the rod 54 forwardly of the standards. A post 118 is rigidly secured to the platform 18 near the base of the arm 20 and mounted on the top of the post is a plate 119 provided with an opening adapted to receive a bolt 120 for pivotally mounting a substantially L-shaped bracket 121 having arms 122 and 123. The arm 122 being curved downwardly as indicated at 124. Pivotally mounted to the rear end of the arm 122 by a bolt or the like 125 is a link 126 having its opposite ends pivotally connected by a bolt 127 to the end of the horizontal bar 117 which extends outwardly a slight distance from the standard 49. Pivotally mounted to the outer end of the arm 123 by a bolt 130 is the yoke end 131 of a rod 132 leading to a lever 133. The lower end of the lever 133 is curved as indicated in dotted lines (Fig. 1) and has its lower end pivotally mounted by a bolt 134 to an ear 135 on the housing of the tractor also as illustrated in Fig. 1. The lever 133 is provided with a bracket 135 to which the yoke end 136 of the rod 132 is pivotally mounted by a bolt 137.

Operation of a device constructed and assembled as described is as follows:

When it is desired to use the saw in the vertical position as illustrated in Fig. 1, the tractor is backed up to the desired position in relation to the work and the frame 2 adjusted by operation of the hydraulic means of the tractor to raise or lower the frame to the desired height and the angularity of the platform 18 with respect to the frame 2 may be adjusted by sliding movement of the strap irons of the horizontal arm 22. Operation of the motor of the tractor will drive the shaft 88 through the universal connection 96 and through the beveled gear connection with the shaft 77 the saw 78 will be rotated. Feed of the saw into the work is accomplished by raising of the lever 103 to lower the rear end of the shaft housing 62 with respect to the work. Lowering of the lever will raise the saw away from the work to the upper position as shown in Fig. 1. With the saw operating in vertical position, the sleeve 64 engages the bolt 61 as shown in Fig. 5.

When it is desired to use the saw in horizontal position as shown in Fig. 2 for felling trees or the like, the bolt 61 is removed from the sleeve 64 and the housing turned so that the sleeve 64' will engage the bolt 61 in the position shown in Fig. 2. Adjustment of the saw to a horizontal position as shown in Fig. 2 may also be accomplished by removal of the stud bolts 71 from the flanges 68 and 69 of the shaft housing and the housing 73 on the rear end of the shaft housing rotated one-quarter turn or until the saw is in vertical position. The stud bolts are then set in the flanges and the saw is ready for operation.

In operation of the saw in this position, the tractor is backed up to the standing tree so that the saw is to one side of the tree and operation of the motor causes the saw to rotate. The saw is fed to the tree by operation of the lever 133 either forwardly or backwardly depending on which side of the tree the saw is placed. If it is desired to move the saw to the right or towards the wheel 138 of the tractor, the pull of the lever 133 rearwardly or towards the attachment, the platform frame 44 will be moved to the right by arrangement of the bracket 122 and link 124 connected to the horizontal bar 117, the hook plate 45 moving around the arc of the platform 18 conversely, the saw may move to the left by forward movement of the lever to pull the saw in that direction through the bracket and link arrangement.

If the frame work 44 is desired to be held in a desired position on the platform 118, the hook 51 is provided with threaded openings adapted to receive threaded pins 133 so that the inner ends of the pins will engage the lower side of the platform to hold the frame work rigidly thereto upon tightening of the bolts.

It will be obvious from the foregoing that we have provided saw attachment for tractors operable from the hydraulic lift of the tractor adapted for adjustment to the hydraulic lift of the tractor and adapted to be driven to a universal connection of the power take-off and wherein feed of the saw is manipulated either in a horizontal or vertical position by operation of the levers 103 and 133.

It will further be obvious that other mechanism than a saw may be actuated with my invention from the power take-off, such as post augers, grinders, cutters and the like.

What we claim and desire to secure by Letters Patent is:

1. In combination with a tractor having hydraulic lift apparatus including power-operated vertically movable lift arms said tractor further including a rearwardly extending power take-off shaft, a saw attachment comprising, a frame pivotally mounted on the rear of the tractor and to the hydraulic lift apparatus for vertical swinging movement, said frame including a cross bar on its rear end, a platform rigidly secured to said cross bar, means for adjusting angularity of said platform with respect to said frame, said means including an adjustable arm having one end mounted on the tractor and its other end supported by braces mounted on said cross bar and said platform and chains secured to the cross bar and adjustably connected to said adjustable arm, a frame pivotally mounted on said platform for lateral movement of its rear end therearound, said last-named frame including uprights, a shaft housing extending rearwardly of said first-named frame and between said upright of the second-named frame, means for pivotally mounting said housing on said platform for vertical movement of its rear end with respect to said platform, a rotary saw mounted on the rear end of said shaft housing, means operatively connecting said saw with the power take-off shaft, and lever means connected to the tractor and to the second named frame for moving said second-named frame laterally of said platform to feed said saw to and from said work when the saw is in horizontal position.

2. In combination with a tractor having hydraulic lift apparatus including power-operated vertically movable lift arms said tractor further including a rearwardly extending power take-off shaft, a saw attachment comprising, a frame pivotally mounted on the rear of the tractor and to the hydraulic lift apparatus for vertical swinging movement, said frame including a cross bar on its rear end, a platform rigidly secured to said cross bar, means connected to the tractor and to the front portion of the platform for adjusting angularity of said platform with respect to said frame, said platform having a rounded rear edge, a frame pivotally mounted on said platform for lateral movement of its rear end therearound, said last-named frame including uprights, a shaft housing extending rearwardly of said first-named frame and between said upright of the second-named frame, means for pivotally mounting said housing on said platform for vertical movement of its rear end with respect to said platform, a rotary saw mounted on the rear end of said shaft housing, means operatively connecting said saw to the power take-off shaft, means for rotatably mounting said saw on said housing to adjust said saw to vertical and horizontal position and means for moving said second-named frame laterally of said platform to feed said saw to and from said work when the saw is in horizontal position.

3. In combination with a tractor having hydraulic lift apparatus including power-operated vertically movable lift arms said tractor further including a rearwardly extending power take-off shaft, a saw attachment comprising, a frame pivotally mounted on the rear of the tractor and to the hydraulic lift apparatus for vertical swinging movement, said frame including a cross bar on its rear end, a platform rigidly secured to said cross bar, means for adjusting angularity of said platform with respect to said frame, said means including an adjustable arm having one end mounted on the tractor and its other end supported by braces mounted on said cross bar and said platform and chains secured to the cross bar and adjustably mounted to said adjustable arm, said platform having a rounded rear edge, a frame pivotally mounted on said platform for lateral movement of its rear end therearound, said last-named frame including uprights, a shaft housing extending rearwardly of said first-named frame and between said uprights of the second-named frame, means for pivotally mounting said housing on said platform for vertical movement of its rear end with respect to said platform, a rotary saw mounted on the rear end of said shaft housing, means operatively connecting said saw to the power take-off shaft, means for rotatably mounting said saw on said housing to adjust said saw to vertical and horizontal position and means for moving said second-named frame laterally of said platform to feed said saw to and from said work when the saw is in horizontal position, and means for feeding said saw to and from said work when the saw is in vertical position.

4. In combination with a tractor having a hydraulic lift apparatus including power-operated vertically movable lift arms said tractor further including a rearwardly extending power take-off shaft, a power take-off attachment comprising, a frame pivotally mounted on the rear of the tractor and the hydraulic lift apparatus for vertical swinging movement, said frame including a cross bar on its rear end, a platform rigidly secured to said cross bar, a frame having its forward end pivotally mounted on said platform for lateral movement of its rear end with respect to said platform, uprights mounted on the rear of the frame on the platform, a shaft housing extending rearwardly of said first-named frame between said upright, means on the rear end of said shaft housing for mounting a mechanism to be actuated, means operatively connecting said actuated mechanism with the power take-off of the tractor, a plurality of sleeves rigidly secured to the forward end of said shaft housing, the forward end of said second-named frame including a shaft for mounting one of said sleeves thereon when the actuated mechanism is in vertical position and mounting of the other sleeve thereon when the actuated mechanism is in horizontal position, means connected to the tractor and to the front portion of said platform for regulating angularity of said platform with respect to the first named frame, and means for feeding the actuated mechanism to the work.

5. In combination with a tractor having hydraulic lift apparatus and including a rearwardly extending power take-off shaft, a power attachment comprising, a frame pivotally mounted on the rear of the tractor and to the hydraulic lift apparatus for vertical swinging movement, said frame including a cross bar on its rear end, a platform rigidly secured to said cross bar, said platform having a rounded rear edge, a guide frame pivotally mounted on said platform for lateral movement on its rear end with respect to said platform, said guide frame including spaced uprights, a shaft housing having its forward end pivotally mounted on the forward portion of said platform and its rear end extending between said uprights for vertical movement therebetween, means on the rear end of said shaft housing for mounting a mechanism to be actuated, means operatively connecting said actuated mechanism to the power take-off shaft of the tractor, lever means mounted on the upper portion of said uprights, said means including an arm, a sleeve slidable on said shaft housing rearwardly of said upright, said sleeve having ears and the rear end of said arm being pivotally connected to said ears, whereby operation of said lever will feed said actuated mechanism to and from said work, and means connected to the tractor and to the front portion of said platform for regulating angularity of said platform with respect to the first named frame.

6. In combination with a tractor having hydraulic lift apparatus and including a rearwardly extending power take-off shaft, a power attachment comprising, a frame pivotally mounted on the rear of the tractor and to the hydraulic lift apparatus for vertical swinging movement, said frame including a cross bar on its rear end, a platform rigidly secured to said cross bar, said platform having a rounded rear edge, a guide frame pivotally mounted on said platform for lateral movement on its rear end with respect to said platform, said guide frame including spaced uprights, a shaft housing having its forward end pivotally mounted on the forward portion of said platform and its rear end extending between said uprights for vertical movement therebetween, a rotary saw mounted on the rear end of said shaft housing, means operatively connecting said saw to the power take-off shaft of the tractor, a lever pivotally mounted to the housing of the tractor having a rearwardly extending rod, a bracket pivotally mounted on said platform having one arm pivotally mounted to said rod, a link having one end pivotally connected to the other arm of said bracket, and the other end of said link pivotally connected to said platform frame whereby operation of the lever will feed the saw to and from the work when the saw is in horizontal position.

7. In combination with a tractor having hydraulic lift apparatus and including a rearwardly extending power take-off shaft, a power attachment comprising, a frame pivotally mounted on the rear of the tractor and to the hydraulic lift apparatus for vertical swinging movement, said frame including a cross bar on its rear end, a platform rigidly secured to said cross bar, said platform having a rounded rear edge, a guide frame pivotally mounted on said platform for lateral movement on its rear end with respect to said platform, said guide frame including spaced uprights, a shaft housing having its forward end pivotally mounted on the forward portion of said platform and its rear end extending between said uprights for vertical movement therebetween, a rotary saw mounted on the rear end of said shaft housing, means operatively connecting said saw to the power take-off shaft of the tractor, lever means mounted on the upper portion of said uprights, said means including an arm and a sleeve slidable on said shaft housing rearwardly of said upright, said sleeve having ears and the rear end of said arm being pivotally connected to said ears whereby operation of said lever will feed said saw to and from said work when the saw is in vertical position, and lever means mounted on the tractor axle housing for movement of the saw laterally when the saw is in horizontal position.

EVAN J. BAUSCH.
WALTER W. MULANAX.

REFERENCES CITED

The following references are of record in the file of this patent:

UNITED STATES PATENTS

| Number | Name | Date |
|--------|------|------|
| 934,363 | Rustad | Sept. 4, 1909 |
| 2,312,287 | Renner | Feb. 23, 1943 |
| 2,354,625 | Van Sickle | July 25, 1944 |
| 2,442,726 | Crawford | Dec. 16, 1947 |